US008868136B2

(12) United States Patent
Davidson

(10) Patent No.: US 8,868,136 B2
(45) Date of Patent: Oct. 21, 2014

(54) HANDLING A VOICE COMMUNICATION REQUEST

(75) Inventor: Brian Davidson, Surrey (GB)

(73) Assignee: Nokia Corporation, Espoo (FI)

( * ) Notice: Subject to any disclaimer, the term of this patent is extended or adjusted under 35 U.S.C. 154(b) by 221 days.

(21) Appl. No.: 13/036,448

(22) Filed: Feb. 28, 2011

(65) Prior Publication Data

US 2012/0220347 A1 Aug. 30, 2012

(51) Int. Cl.
*H04B 1/38* (2006.01)
*H04M 1/725* (2006.01)
*H04M 1/27* (2006.01)

(52) U.S. Cl.
CPC .......... *H04M 1/271* (2013.01); *H04M 2250/74* (2013.01); *H04M 1/7255* (2013.01)
USPC ........ 455/567; 455/563; 455/401; 455/412.2; 455/414.1; 455/415

(58) Field of Classification Search
USPC ............ 455/563, 401, 567, 412.2, 414.1, 415
See application file for complete search history.

(56) References Cited

U.S. PATENT DOCUMENTS

| 5,850,435 | A | 12/1998 | Devillier | |
|---|---|---|---|---|
| 7,177,670 | B2 * | 2/2007 | Yoon | 455/569.1 |
| 7,689,253 | B2 * | 3/2010 | Basir | 455/563 |
| 2002/0118800 | A1 * | 8/2002 | Martinez et al. | 379/67.1 |
| 2005/0049860 | A1 * | 3/2005 | Junqua et al. | 704/231 |
| 2010/0151839 | A1 * | 6/2010 | Krishnamurthy et al. | 455/414.1 |
| 2010/0159913 | A1 | 6/2010 | Tong et al. | |

FOREIGN PATENT DOCUMENTS

| EP | 1 093 114 A2 | 4/2001 |
|---|---|---|
| JP | 1-261057 A | 10/1989 |
| JP | 6-205101 A | 7/1994 |
| JP | 2000-197128 A | 7/2000 |
| JP | 2002-247144 A | 8/2002 |
| WO | WO 2009/036602 A1 | 3/2009 |

OTHER PUBLICATIONS

International Search Report from International Patent Application No. PCT/IB2012/050887 mailed May 30, 2012.
Goldman, E. L. et al., *Voice Portals—Where Theory Meets Practice*, International Journal of Speech Technology 4, (2001), pp. 227-240.

* cited by examiner

*Primary Examiner* — Justin Lee
(74) *Attorney, Agent, or Firm* — Alston & Bird LLP

(57) ABSTRACT

Apparatus comprises at least one processor and at least one memory, the at least one memory having stored therein computer-readable instructions which, when executed by the at least one processor, cause the at least one processor: to detect the presence of a first identifier in an audio data portion received from a microphone; to identify a remote device based on the first identifier; to cause an audio data item to be transmitted to the remote device, the audio data item being for use by the remote device to alert a user of the device to the presence of an incoming voice communication request; and to cause a voice communication request to be transmitted to the remote device.

9 Claims, 5 Drawing Sheets

HANDLING A VOICE COMMUNICATION REQUEST

FIELD OF THE INVENTION

The invention relates to the handling of a voice communication request.

BACKGROUND TO THE INVENTION

Communication devices such as mobile telephones provide alerts, such as ringtones, to alert the user of the device to the arrival of an incoming communication. The user of the device is able to select which ringtone is provided upon receipt of an incoming communication.

SUMMARY OF THE INVENTION

According to a first aspect, this specification describes apparatus comprising at least one processor and at least one memory, the at least one memory having stored therein computer-readable instructions which, when executed by the at least one processor, cause the at least one processor: to detect the presence of a first identifier in an audio data portion received from a microphone; to identify a remote device based on the first identifier; to cause an audio data item to be transmitted to the remote device, the audio data item being for use by the remote device to alert a user of the device to the presence of an incoming voice communication request; and to cause a voice communication request to be transmitted to the remote device.

According to a second aspect, this specification describes apparatus comprising at least one processor and at least one memory, the at least one memory having stored therein computer-readable instructions which, when executed by the at least one processor, cause the at least one processor: to receive an indication of receipt of an audio data item from a remote device; to receive an indication of receipt of a voice communication request from the remote device; to cause an audible representation of the audio data item to be provided to a user of the apparatus, via a loudspeaker associated with the apparatus, thereby to alert a user of the apparatus to the existence of the voice communication request.

According to a third aspect, this specification describes a method comprising: detecting the presence of a first identifier in an audio data portion received from a microphone; identifying a remote device based on the first identifier; causing an audio data item to be transmitted to the remote device, the audio data item being for use by the remote device to alert a user of the device to the presence of an incoming voice communication request; and causing a voice communication request to be transmitted to the remote device.

According to a fourth aspect, this specification describes a method comprising: receiving an indication of receipt of an audio data item from a remote device; receiving an indication of receipt of a voice communication request from the remote device; and causing an audible representation of the audio data item to be provided to a user, via a loudspeaker, thereby to alert the user to the existence of the voice communication request.

According to a fifth aspect, this specification describes a non-transitory computer-readable storage medium having stored therein computer-readable code, which, when executed by computing apparatus, causes the computing apparatus: to detect the presence of a first identifier in an audio data portion received from a microphone; to identify a remote device based on the first identifier; to cause an audio data item to be transmitted to the remote device, the audio data item being for use by the remote device to alert a user of the device to the presence of an incoming voice communication request; and to cause a voice communication request to be transmitted to the remote device.

According to a sixth aspect, this specification describes a non-transitory computer-readable storage medium having stored therein computer-readable code, which, when executed by computing apparatus, causes the computing apparatus: to receive an indication of receipt of an audio data item from a remote device; to receive an indication of receipt of a voice communication request from the remote device; and to cause an audible representation of the audio data item to be provided to a user of the apparatus, via a loudspeaker associated with the apparatus, thereby to alert a user of the apparatus to the existence of the voice communication request.

According to a seventh aspect, this specification describes apparatus configured to: to detect the presence of a first identifier in an audio data portion received from a microphone; to identify a remote device based on the first identifier; to cause an audio data item to be transmitted to the remote device, the audio data item being for use by the remote device to alert a user of the device to the presence of an incoming voice communication request; and to cause a voice communication request to be transmitted to the remote device.

According to an eighth aspect, this specification describes apparatus comprising: means for receiving an indication of receipt of an audio data item from a remote device; means for receiving an indication of receipt of a voice communication request from the remote device; and means for causing an audible representation of the audio data item to be provided to a user, via a loudspeaker, thereby to alert the user to the existence of the voice communication request.

According to a ninth aspect, computer-readable instructions which, when executed by computing apparatus, cause the computing apparatus to perform a method according to either of the third and fourth aspects.

BRIEF DESCRIPTION OF THE FIGURES

For a more complete understanding of example embodiments of the present invention, reference is now made to the following description taken in connection with the accompanying drawings in which.

DETAILED DESCRIPTION OF THE EMBODIMENTS

Figure 1:
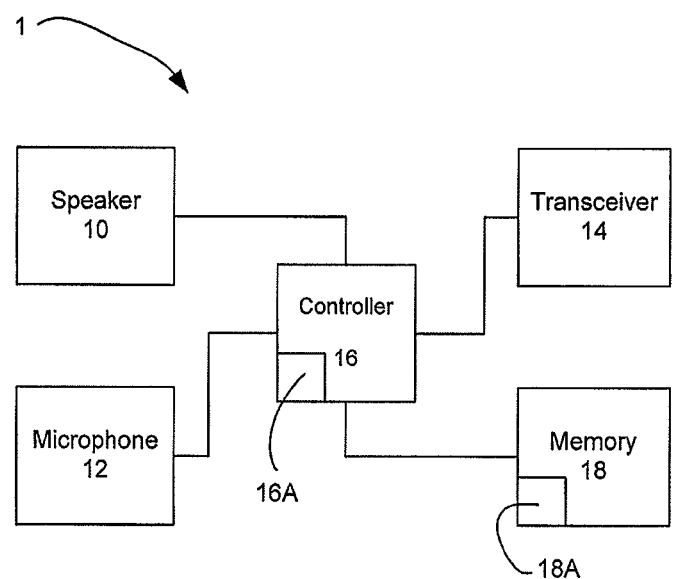
FIG. 1 is a schematic illustration of apparatus according to example embodiments of the invention.

In the description and drawings, like reference numerals refer to like elements throughout.

FIG. 1 is a schematic illustration of apparatus 1 according to example embodiments of the invention.

The apparatus 1 comprises a loudspeaker 10. The loudspeaker 10 is operable to convert electrical data signals into audible sound for consumption by a user of the apparatus 1.

The apparatus 1 also comprises a microphone 12. The microphone 12 is operable to convert audible sound into electrical data signals. The apparatus also comprises a transceiver 14. The transceiver 14 is operable to send and receive signals from a network (not shown in FIG. 1). The transceiver 14 may comprise any combination of different types of transceiver, transmitter or receiver. The transceiver 14 may be operable to communicate using any different type of communication protocol, for example GPRS, GSM, Bluetooth and infrared etc.

The apparatus 1 comprises a controller 16. The apparatus also comprises a memory 18. The controller is operable to cause data to be stored in the memory 18. The controller is operable also to retrieve stored data from the memory 18.

The controller 16 is operable to control each of the loudspeaker 10, the microphone 12 and the transceiver 14. As such, the controller 16 is operable to provide data in the form of electrical signals to the loudspeaker 10, thereby to cause the loudspeaker 10 to provide audible representations of the data for consumption by the user. The data may have been received from the transceiver 14 or retrieved from the memory 18. The controller 16 is operable also to cause the microphone 12 to convert incoming audible sound into data in the form of electric signals. The controller 16 is also operable to route the data to the transceiver 14 to be sent via the network, or to the memory 18 for storage.

The controller 16 may comprise one or more distinct entities. The controller 16 comprises at least one processor 16A. The term processor is intended to encompass any suitable type of processor or microprocessor. The controller may also comprise one or more application specific integrated circuits (not shown). The controller 16 is operable to control the other components under the control of computer readable instructions 18A stored in the memory 18.

The memory 18 may comprise one or more distinct entities. The one or more entities may comprise non-transitory computer-readable media. The entities may be any combination of volatile or non-volatile media, such as but not limited to ROM, RAM and EEPROM, PROM, EPROM, flash memory, DRAM etc.

The controller 16 is operable to perform actions in response to commands received via the microphone 12. As such, the controller 16 is operable to analyse the data signals created by the microphone based on sounds received at the microphone 12, and is operable to perform actions based on the results of the analysis. In particular, the controller 16 is operable to recognise a data signal which results from a particular word or phrase when it is spoken by the user into the microphone 12. In other words, the controller 16 is operable to analyse a portion of an incoming audio data stream received from the microphone 18 to detect the presence of a first identifier (e.g. a word or a phrase) therein.

According to some example embodiments, detection of the first identifier may be performed using known voice recognition techniques to identify words spoken by the user. For example, the user may speak the name of a contact, the details of which are stored in the memory 18 of the apparatus 1. The controller 16 may use voice recognition techniques to identify the contact based on the data signal received from the microphone 12. The controller 16 is operable subsequently to perform an action in respect of that contact. In particular, the controller is operable to cause a message to be sent to a device of the contact, based on a telephone number or other type of device identifier stored in the memory 18. The controller 16 is operable also to cause a voice communication request to be sent to the device of the contact. Such a request includes the controller 16 attempting to initiate a telephone call with the device of the identified contact.

According to other example embodiments, a database of reference data samples may be stored in the memory 18. Each reference data sample is associated with a different contact, and may comprise the data resulting from a previous instance of the user speaking the name of the contact into the microphone 12. Thus, when a data signal is received from the microphone, the controller 16 is operable to compare the signal with the reference data samples stored in the database to identify a particular contact.

Identifiers identifying contacts may be known as contact identifiers. The controller 16 may also be operable to recognise types of identifier other than contact identifiers. For example, in some example embodiments, the controller 16 is operable to recognise identifiers related to various commands. In particular, the controller 16 may be operable to recognise a particular word or phrase, as being a command to begin analysing the incoming data signal for an identifier associated with a contact. In this way, the user may speak a command, which is recognised by the controller 16 as an indication that the user is about to speak the name of a contact with whom they want to initiate a voice communication.

It will be appreciated that the apparatus 1 may comprise other components to those that have been described above. It will be appreciated also that the apparatus 1 may comprise one or more different physical entities. For example, the loudspeaker 10 and the microphone 12 may be provided in a different physical entity than the transceiver 14, the controller 16 and the memory 18. In such an example, the loudspeaker 10 and the microphone 12 may be provided in a personal headset, which may be in wired or wireless communication with the remainder of the apparatus, for example, via the transceiver 14.

Figure 2:
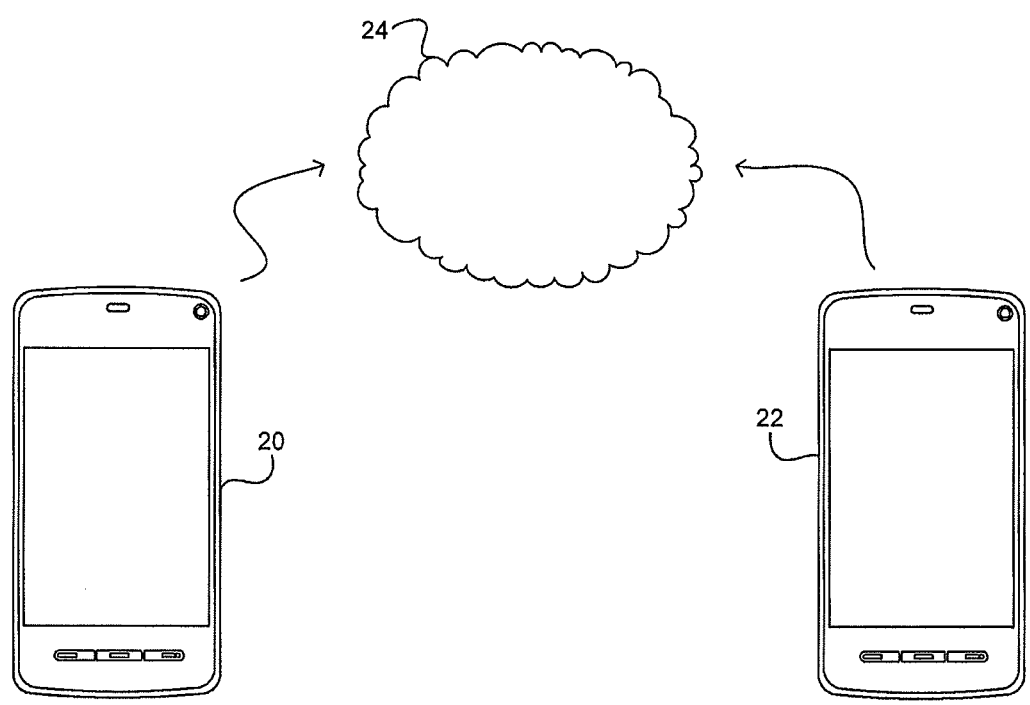
FIG. 2 is a schematic illustration of a system in which apparatus according to example embodiments of the invention may reside.

FIG. 2 is a schematic illustration of a system in which the apparatus 1 of FIG. 1 may reside.

The system 2 of FIG. 2 comprises a first device 20, a second device 22 and a network 24. Each of the first and second devices 20, 22 comprise an apparatus 1 as described with reference to FIG. 1. In the example of FIG. 2, the first and second devices 20, 22 comprise mobile terminals which are operable to communicate with one another via the network 24. The network 24 may be operable to communicate with the devices 20, 22 using any suitable type of protocol, including but not limited to GPRS, GSM, EDGE, CDMA and Internet Protocol. The network 24 is operable to route signals received from the first device 20 to the second device 22 and vice versa, thereby allowing the first and second devices 20, 22 to communicate with one another. The network 24 may include any number of base stations, servers etc.

Example embodiments of the invention will now be described in general terms with reference to FIGS. 3A to 3E.

Figure 3A:
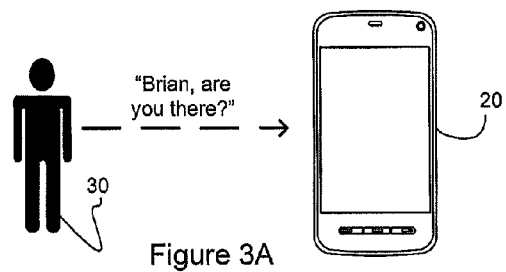
FIGS. 3A to 3E are simplified illustrations depicting, in general terms, methods according example embodiments of the invention.

In FIG. 3A, the user 30 (in this example called Alan) of the first device 20 speaks into the microphone 12 of the first device 20. As mentioned above, the microphone 12 may be provided in the device or may be provided in a separate entity such as a hands-free headset. In this example, Alan 30 speaks the phrase "Brian, are you there?". The controller 16 of the first device 20 recognises this phrase as indicating that Alan wishes to initiate communication with one of his contacts (in this example Brian). In other words, the controller 16 analyses the signal received from the microphone and detects the presence therein of an identifier which indicates that the Alan wishes to initiate a voice call with Brian 32. In addition to analysing the audio data signal resulting from the spoken phrase, it is also stored in the memory 18.

In response to this determination, the controller 16 retrieves a device identifier from the memory 18. The device identifier associated with the second device 22, which in this example is associated with Brian 32, allows the second device to be contacted. In addition to retrieving the device identifier, the controller 16 also prepares a data package containing the stored audio data signal. This data package may also be referred to as an audio data item.

Figure 3B:
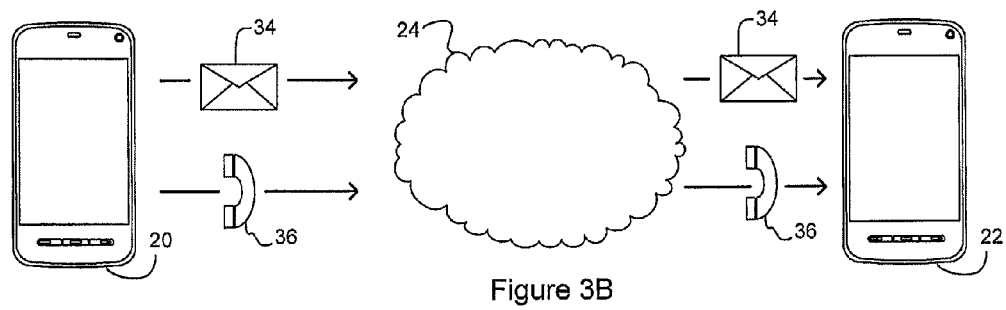

Next, as can be seen in FIG. 3B, the controller 16 causes the data package (or audio data item) 34 to be transmitted, via the transceiver 14, from the first device 20 to the network 24 which routes it second device 22. At substantially the same time, the controller 16 of the first device 20 attempts to initiate a voice communication with the second device 22. Put in other words, the controller 16 of the first device sends a voice communication request 36, which is routed via the network 24, to the second device 22. Both the audio data item 34 and the voice communication request 36 are sent using the device identifier associated with Brian 32. According to some example embodiments, the audio data item 34 and the voice communication request 36 may be sent as part of the same signal.

Figures 3C, 3D:
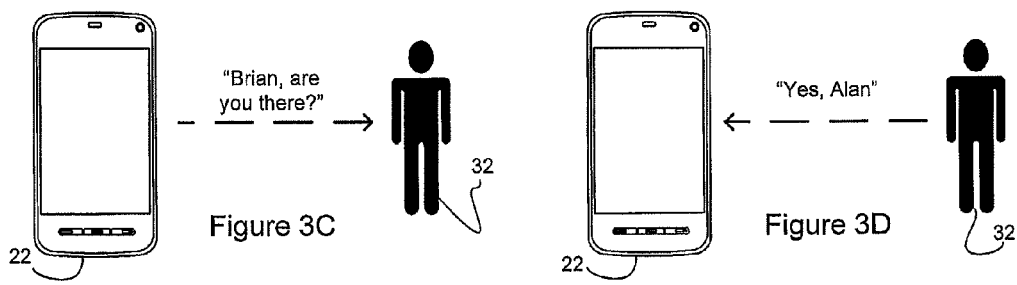

In FIG. 3C, having received the audio data item 34 and the voice communication request 36, the controller 16 of the second device 22 causes an audible representation of the audio data signal contained in the audio data item 34 to be output by the loudspeaker 10 of the second device 22. This serves to alert Brian 32 (the user of the second device 22) to the existence of the incoming voice communication request 36. As such, the audio data signal, which is a recording of Alan 30 speaking the phrase "Brian, are you there?", acts as a ringtone. As described above, the loudspeaker 10 and microphone 12 associated with the second device 22 may be embodied in a hands-free headset which is in wired or wireless communication with the second device 22.

Figure 3E:
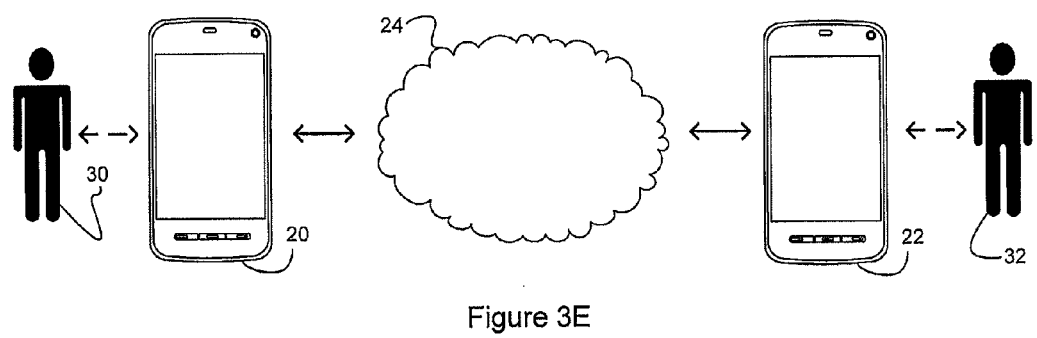

In FIG. 3D, Brian speaks a command into the microphone 12 of the second device 22, which indicates that would like to accept the voice communication request 36. The controller 16 recognises this command, and, in response, accepts the incoming voice communication request 36. As such, as can be seen in FIG. 3E, a voice communication channel is established between the first and second devices 20, 22, thereby allowing Alan 30 and Brian 32 to speak to one another.

The above-described method provides a simple and intuitive system for beginning a voice communication session between two devices at locations which are remote from one another. The provision of the audio data signal (captured at the first device 20) as the ringtone to alert the user of the second device to the existence of an incoming voice communication request gives the users the impression that there is a permanent communication link between the two devices. The method also allows the user 30 of the first device 20 to begin a conversation with the user 32 of the second device 22 as they would if the two users were in the close physical proximity to one another and not at remote locations. Thus, Alan speaks a greeting, for example, "Brian, are you there?" or "Hello Brian" which is transmitted from Alan's device 20 to Brian's device 22 and is subsequently output by Brian's device 22. Brian 32 simply accepts the incoming voice communication at his device and a conversation can be carried out. In this way, the above-described method provides an improved user experience for users of apparatuses and devices operating according to example embodiments of the invention. Moreover, where a voice command is used by Brian 32 to accept the request 36, a voice communication channel is established between the two devices 20, 22 without either user 30, 32 being required to provide inputs physically (such as by pressing buttons, keys etc) to their device.

Figure 4:
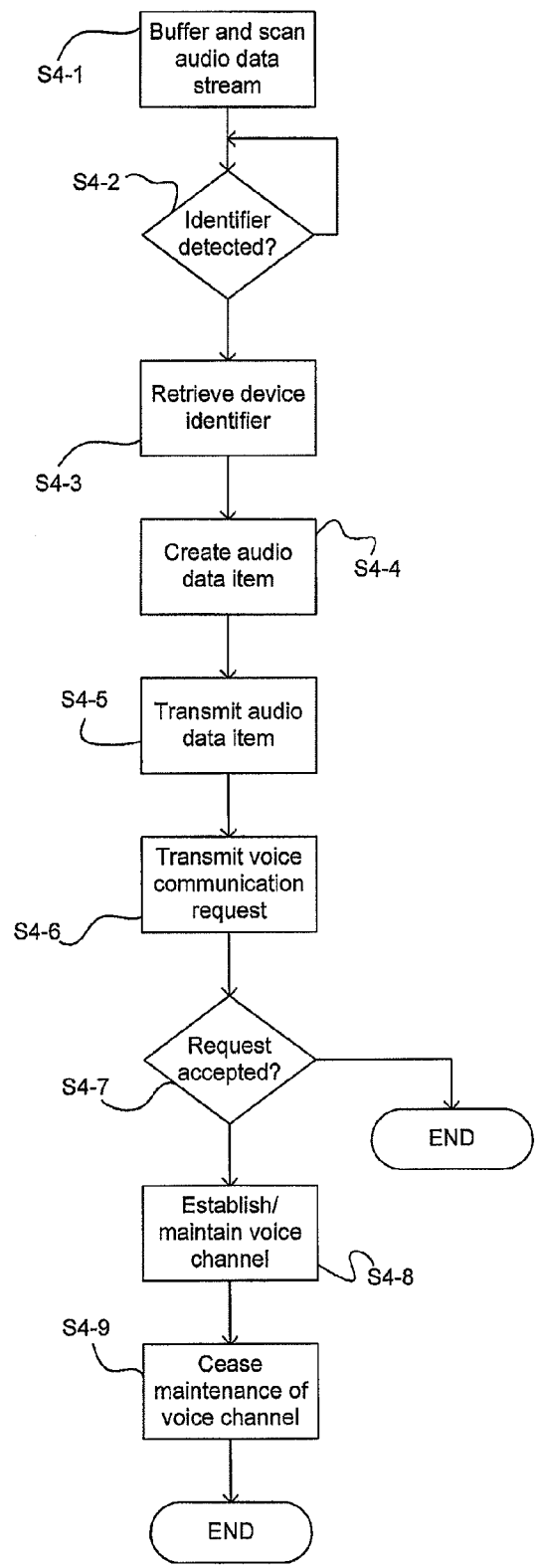
FIGS. 4 to 6 are flow diagrams illustrating, in more specific terms, methods according to example embodiments of the invention.
Figure 5:
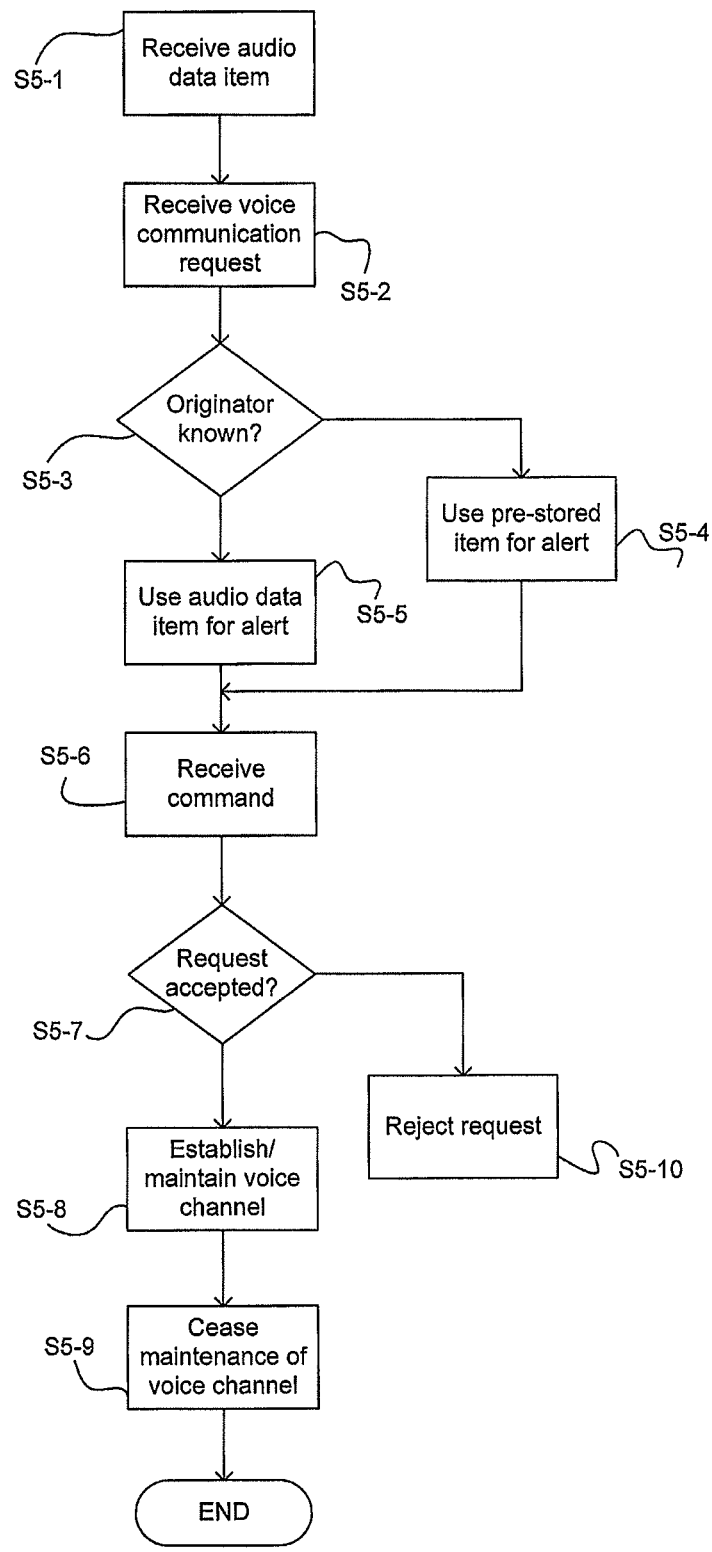
Figure 6:
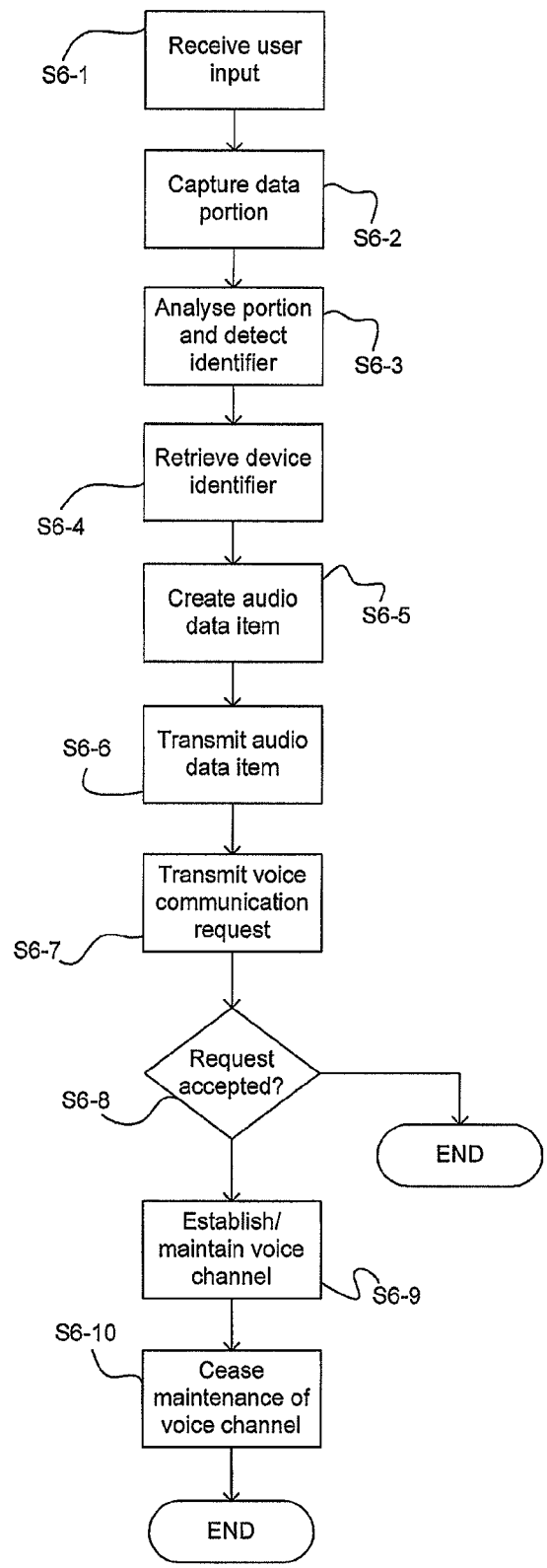

FIGS. 4 to 6 are flow diagrams illustrating, in more specific terms, methods according to example embodiments of the invention.

FIG. 4 is a flow diagram illustrating a method according to example embodiments of the invention. The method of FIG. 4 may be carried out by the at least one processor 16A of the controller 16 of the first device 20 under the control of the computer-readable instructions 18A stored in the memory 18.

In step S4-1, the controller 16 causes an audio data stream, which is received from the microphone 12 to be stored in a buffer (not shown) which is part of the memory 18. The buffer is operable to store a finite amount of data, for example equivalent to five seconds worth of an audio data stream. Thus, the controller 16 causes the buffer to be continuously updated to include a portion of the audio data stream which was most recently received from the microphone 12.

In addition to causing the audio data stream to be buffered, the controller 16 is operable to scan or analyse the incoming data stream so as to detect the presence of one or more identifiers within the audio stream. The identifiers may comprise, for example, a word or phrase which is recognisable by the controller 16. An identifier identifies at least a contact, details for whom are stored in the memory 18. The details may include a device identifier, which enables the first device 20 to communicate with a device associated with the contact. Examples of device identifiers include telephone numbers etc.

Next, in step S4-2, the controller determines if an identifier is present within the buffered audio data stream.

Identifiers may be recognised by the controller 16 using standard voice recognition techniques, such as voice to text techniques. In such example embodiments, the controller 16 compares a text string (or data indicative of such) which is produced using voice to text techniques based on at least a portion of the buffered audio data stream. If the text string matches, or sufficiently matches, a text string associated with a contact (and, as will be understood from the below paragraphs, optionally also a command) stored in memory 18, the identifier is recognised.

In other example embodiments, identifiers may be recognised by comparing portions of the audio data stream, which are stored in the buffer, with reference audio data samples stored in memory 18. The reference audio data samples may be audio data signals from previous instances of the user speaking the name of a contact (and, optionally, also a command). Reference audio data samples from previous instances of the user speaking the name of a contact may be stored in the memory 18 in association with the contact to which the reference audio data sample is associated. As such, the controller 16 detects that an identifier is present within an audio data stream when it is determined that a sufficient level of identity exists between a portion of an audio data stream and a reference audio data sample.

In some example embodiments, detection of a single identifier, which only identifies a contact, may be sufficient for the controller to proceed to the next step (S4-3) in the method. For example, it may be sufficient for a user to speak the name "Brian" into the loudspeaker.

In other example embodiments, two identifiers may be required to be detected in the audio data portion for the method to proceed. For example, a first identifier may identify the contact and the second identifier, referred to above as the command, may indicate that the user wishes to initiate a voice communication session with that contact. Let us consider the example, "Brian, are you there?". The controller 16 may recognise "Brian" as a first identifier which identifies a contact named Brian. The controller 16 may also identify "are you there?" as a second identifier, which indicates that the user wishes to begin a communication session with the contact identified by the first identifier.

The requirement for two identifiers to be present in an audio data stream in order for a voice communication to be initiated reduces the chance of proceeding to the next steps in the method, one of which is the initiation of a voice communication session, accidentally. This may be particularly useful when a hands-free headset is being used. This is because the user might say the name of a contact (for example when in conversation with a person in the same geographic location), e.g. when referring to that contact, without actually wanting to speak to the contact. It is less likely however that the user will speak the combination of first and second identifier (e.g. "Brian, are you there?) without wanting to initiate a voice communication session with that contact. It will be appreciated, that the same effect can be achieved by using reference data samples which are phrases (e.g. "Brian, are you there?") instead of just single words (e.g. "Brian").

If in step S4-2, the controller 16 determines that an identifier is present in the audio data stream, the method proceeds to step S4-3. If, in step S4-2, a device identifier is not detected, step S4-2 is repeated until it is determined that an identifier is present in the data stream.

In step S4-3, following detection of the identifier in the audio data stream, the controller 16 retrieves from memory the device identifier associated with the identified contact (identified using the identifier present in the buffered audio stream).

In step S4-4, the controller 16 causes the portion of the data stream stored in the buffer which contains the identifier (or identifiers) to be packaged into an audio data item 34.

Next, in step S4-5, the controller 16 causes the audio data item 34 to be transmitted to a device (i.e. the second device 22) associated with identified contact. The audio data item is transmitted based on a retrieved device identifier associated with the identified contact. The audio data item 34 is transmitted to the second device 22 for use by the second device 22 to alert the user 32 of the second device 22 to the presence of an incoming voice communication request 36.

In step S4-6, the controller 16 causes a voice communication request 36 to be transmitted, based on the device identifier, to the device (the second device 22) associated with the identified contact. A voice communication request may be sent, for example, by the controller 20 causing a number associated with the remote device to be dialled.

Steps S4-5 and S4-6 are carried at substantially the same time. In some embodiments, the audio data item 34 is carried in the same signal as the voice communication request 36. The order and the exact relative timings of transmission of the audio data item 34 and the voice communication request 36 may not be important as long as the audio data item 34 arrives at the remote device 22 such that it can be used in providing an audible alert for alerting the user 32 of the second device 22 to the existence of the incoming voice communication request 36.

Next, in step S4-7, the controller 16 of the first device 20 determines if the second device has accepted the voice communication request 36, thereby to allow a voice communication channel to be established between the first and second device 22.

Following a negative determination (i.e. a determination that the second device 22 has rejected the voice communication request), the method ends.

Following a determination that second device 22 has accepted the voice communication request, the method proceeds to step S4-8. In step 4-8, the controller 16 of the first device 20 establishes and maintains a voice communication channel between the first device 20 and the second device 22.

Next in step S4-9, following an indication that the user of either device 20, 22 wishes to terminate the voice communication session, the controller 16 of the first device 20 ceases maintenance of the voice communication channel. Subsequent to this, the method ends.

FIG. 5 is a flow diagram illustrating a method according to example embodiments of the invention. The method of FIG. 5 may be carried out by the at least one processor 16A of the controller 16 of the second device 22 under the control of the computer-readable instructions 18A stored in the memory 18.

In step S5-1, the controller 16 receives an indication from the transceiver 14 that the audio data item 34 (transmitted in step S4-5 of FIG. 4) has been received at the second device 22 from the first device 20.

In step S5-2, the controller 16 receives an indication that a voice communication request 36 has been received from the first device 20 at the second device 22.

As will be understood from steps S4-5 and S4-6 of FIG. 4 described above, the order of steps S5-1 and S5-2 may not be important. In some embodiments, the audio data item 34 and the voice communication request may be received at substantially the same time. The audio data item 34 may be carried in the same signal as the voice communication request 36. The exact relative timings of receipt of the audio data item 34 and the voice communication request may not be important as long as the audio data item arrives at the second device 22 such that it can be used in providing an audible alert for alerting the user 32 of the second device 22 to the existence of the incoming voice communication request 36.

The audio data item 34 and/or the voice communication request 36 may include an indication that they relate to a single communication. For example, the audio data item may include an indication, such as a flag, that the controller 16 of the second device 22 should expect to receive a voice communication request 36 for which the audio data item 34 is to be used in providing the alert to the user. Similarly, the communication request 36 may include an indication, such as a flag, that an audio data item 34, which is to be used in providing the alert to the user, should be expected to be received. In this way, the controller 16 of the second device knows that the audio data item 34 and the voice communication request 36 are linked and thus knows how they should be handled.

Next, in step S5-3, the controller 16 of the second device 22 determines if the originator (i.e. the first device 20) of the audio data item 34 and the voice communication request 36 is recognised. This may occur, for example, by comparing a calling number identification (CNID) element that is included in the signal or signals that transports the audio data item 34 and the voice communication request 36 with CNID elements stored in the memory 18 of the second device 22. Alternatively, recognition of the originator of the audio data item 34 and the voice communication request 36 may be performed using any other suitable protocol.

If, in step S5-3, it is determined that the first device 20 is not recognised, the method proceeds to step S5-4. In step S5-4, the controller 16 of the second device causes the user 32 to be alerted as to the receipt of the voice communication request, without using the received audio data item 34. This may be carried out, for example, using a standard ringtone that is pre-stored in the memory 18 of the second device 22. Following step S5-4, the method proceeds to step S5-6.

If, in step S5-3, it is determined that the first device 20 is recognised, the controller 16 proceeds to step S5-5. In step S5-5, the controller 16 of the second device 22 causes an audible representation of the audio data stored within the audio data item 32 to be provided to the user 32 via the loudspeaker 10. Thus, the user 32 of the second device 22 is alerted to the existence of an incoming voice communication request 36. As such, the user 32 may hear the phrase "Brian, are you there" as spoken by the user of the first device 20. Following step S5-5, the method proceeds to step S5-6.

It will be appreciated that step S5-3 may be optional and that the method may instead proceed directly from step S5-2 to step S5-5. However, determination as to whether the originator of the audio data item 34 and voice communication request 36 is known may ensure that recordings of words and phrases spoken by strangers are not automatically output via the loudspeaker 10 of the device 22. In some example embodiments, the user 32 of the second device may have specified a list of contacts, which is stored in memory 18, from whom received audio data items 34 are to be used as the alert of an incoming voice communication request. In such embodiments, in step S5-3, the controller determines whether the originator of the audio data item 34 and incoming voice communication request 36 is on the specified list of contacts.

In some embodiments, the controller 16 of the second device 22 may respond to a user input by activating a mode in which a received audio data item 34 is never used as an alert, regardless of the originator device. When in this mode, the controller 16 may proceed directly from step S5-2 to step S5-4.

In step S5-6, the controller 16 receives an input from the user 32. The input may be a voice input recognised using similar techniques to those described above with reference to step S4-2 of FIG. 4. For example, the user 32 of the second device 22 may speak into the microphone "Yes" or "No". It will be appreciated that any suitable phrase or word may be used as a voice input. According to alternative embodiments, the command may be provided to the device via another user interface such as, but not limited to, a mechanical key, a touchpad or a touchscreen.

In step S5-7, the controller 16 determines based on the received command, whether or not the voice communication request 36 is to be accepted. Thus, the controller 16 determines whether the received input is indicative of the user 32 wishing to accept or decline the voice communication request. In embodiments in which voice inputs are used, the word "Yes" may indicate acceptance of the request 36 and "No" may indicate refusal of the request 36.

In some example embodiments, audio data equivalent to a recording of the voice command of the user of the second device 22 may be sent from the second device 22, under the control of the controller 16, to first device 20. Upon receiving this audio data, the controller 16 of the first device causes the audio data to be output, via the loudspeaker 10, to the user of the first device 20. As such, the user of the first device 20 would hear the user of the second device saying "Yes Alan, I am here". This may occur immediately prior, or subsequent, to the voice channel being established between the two devices.

Following a positive determination in step S5-7, the method proceeds to step S5-8 in which the controller 16 opens and maintains a voice communication channel with the first device.

Next in step S5-9, following an indication that the user of either device 20, 22 wishes to terminate the voice communication session, the controller 16 of the second device 22 ceases maintenance of the voice communication channel. Subsequent to this, the method ends.

Following a negative determination in step S5-7, the method proceeds to step S5-10 in which the controller 16 rejects the voice communication request. Subsequent to this, the method ends.

According to some example embodiments, the method of FIG. 5 may include a step wherein, subsequent to receiving the voice communication request and/or the audio data item, the controller 16 automatically sets the device 22 into voice recognition mode. In voice recognition mode, the controller 22 is operable to detect voice commands received via the microphone and to act accordingly. For example, the following activation of the voice recognition mode, the controller 16 is responsive to receipt of the command from the user "Yes, I am here Alan" to cause the voice communication channel to be established between the two devices 20, 22. This optional step may occur, for example, immediately after any one of steps S5-1 to S5-5.

FIG. 6 is a flow diagram illustrating a method according to example embodiments of the invention. The method of FIG. 6 may be carried out by the at least one processor 16A of the controller 16 of the first device 20 under the control of the computer-readable instructions 18A stored in the memory 18.

In step S6-1, the controller 16 receives a user input indicating to the controller that the user 30 of the first device 20 is about to provide a voice command identifying a contact with whom they wish to hold a voice communication session. In some example embodiments, the user input may comprise a voice input. The voice input may comprise receipt, via the microphone 12, of a particular word or phrase, for example, "Enter voice dialling mode". In such embodiments, the controller 16 continuously monitors audio data received from the microphone 12. In other example embodiments, the user input may comprise a physical user input such as a key press etc.

Next, in step S6-2, in response to receipt of the user input in step S6-1, the controller 16 begins to cause the audio data signal received from the microphone to be stored in the memory 18.

In step S6-3, the controller analyses the captured portion of audio data in order to detect the presence of at least one identifier. The at least one identifier comprises an identifier identifying a contact stored in the memory 18 of the device 20, and optionally an identifier indicating that the user wishes to establish a voice communication session with the identified contact. In some embodiments it may be sufficient for the audio data portion to include only one identifier identifying the contact. Detection of the at least one identifier is performed as described above with reference to step S4-2 of FIG. 4.

Subsequent to step S6-3, the method proceeds to step S6-4. Steps S6-4 to S6-10 of the method of FIG. 6 are the same as steps S4-3 to S4-9 respectively of the method of FIG. 4. As such, further description of these steps is not included.

The method implemented by the controller 16 of the second device 22, such as the example embodiment described with reference to FIG. 6, may be the same regardless of whether the methods of FIG. 4 or FIG. 6 are performed by the controller 16 of the first device 20.

In the above described methods, the audio data signal that is included in the audio data item 34 is the same as that used to initiate sending of the voice communication request 36. However, according to some alternative example embodiments, the audio data that is sent in the audio data item may be pre-stored in the memory in association with a particular contact. As such, when the controller 16 detects the presence of an identifier in an audio data stream, the controller 16 may retrieve the pre-stored audio data associated with the identified contact and package it as an audio data item for use, as an alert by, the device of the identified contact. In example embodiments in which the identifier is detected by comparing the audio data portion with a reference audio data sample, the reference audio data sample may be packaged into the audio data item and transmitted to the device of the identified contact.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. Apparatus comprising at least one processor and at least one memory, the at least one memory having stored therein computer-readable instructions which, when executed by the at least one processor, cause the at least one processor:
   to detect the presence of at least one identifier in an audio data portion received from a microphone, the audio data portion being a portion of an audio data stream, the at least one identifier indicating that a voice call is required to be initiated and indicating a remote device to which the voice call is required;
   to identify a device identifier associated with the remote device based on the at least one identifier; and
   to cause an audio data item and a voice communication request to be transmitted to the remote device based on the device identifier, the audio data item being used by the remote device to alert a user of the remote device to the presence of the incoming voice communication request,
   wherein the audio data item includes at least part of the audio data portion and wherein the at least part of the audio data portion includes the at least one identifier which indicates that the voice call is required to be initiated and which indicates the remote device to which the voice call is required.

2. The apparatus of claim 1 wherein the audio data portion is a portion of an audio data stream and wherein the computer-readable instructions, when executed by the at least one processor, cause the at least one processor:
   to analyze the audio data portion to detect the presence of the first identifier in response receiving a signal indicative of a user input.

3. The apparatus of claim 2, wherein the user input is a voice input.

4. The apparatus of claim 1, wherein:
   the at least one identifier includes a first identifier indicating the remote device to which the voice call is required and a second identifier indicating that the voice call is required to be initiated; and
   the voice communication request is caused to be transmitted to the remote device in response to detection of the second identifier in the audio data portion.

5. A method comprising:
   detecting the presence of at least one identifier in an audio data portion received from a microphone, the audio data portion being a portion of an audio data stream, the at least one identifier indicating that a voice call is required to be initiated and indicating a remote device to which the voice call is required;
   identifying a device identifier associated with the remote device based on the first identifier; and
   causing an audio data item and a voice communication request to be transmitted to the remote device based on the device identifier, the audio data item being used by the remote device to alert a user of the remote device to the presence of the incoming voice communication request,
   wherein the audio data item includes at least part of the audio data portion and wherein the at least part of the audio data portion includes the at least one identifier which indicates that the voice call is required to be initiated and which indicates the remote device to which the voice call is required.

6. The method of claim 5, wherein the audio data portion is a portion of an audio data stream and wherein the method comprises:
   analyzing the audio data portion to detect the presence of the first identifier in response to receiving a signal indicative of a user input.

7. The method of claim 6, wherein the user input is a voice input.

8. The method of claim 5,
   wherein:
      the at least one identifier includes a first identifier indicating the remote device to which the voice call is required and a second identifier indicating that the voice call is required to be initiated; and
      the voice communication request is caused to be transmitted to the remote device in response to detection of the second identifier in the audio data portion.

9. A non-transitory computer-readable storage medium having stored therein computer-readable code, which, when executed by computing apparatus, causes the computing apparatus:
   to detect the presence of at least one identifier in an audio data portion received from a microphone, the audio data portion being a portion of an audio data stream, the at least one identifier indicating that a voice call is required to be initiated and indicating a remote device to which the voice call is required;
   to identify a device identifier associated with the remote device based on the at least one identifier; and
   to cause an audio data item and a voice communication request to be transmitted to the remote device based on the device identifier, the audio data item being used by the remote device to alert a user of the remote device to the presence of the incoming voice communication request,
   wherein the audio data item includes at least part of the audio data portion and wherein the at least part of the audio data portion includes the at least one identifier which indicates that the voice call is required to be initiated and which indicates the remote device to which the voice call is required.

* * * * *